3,263,500
MAGNETIC FLOWMETER
Prathivadhi Bayankaram Krishnaswamy, Philadelphia, Donald L. Ham, Northampton, and John Peter Fath, Trevose, Pa., assignors to Fischer & Porter Company, Warminster, Pa., a corporation of Pennsylvania
Filed Aug. 27, 1962, Ser. No. 219,499
7 Claims. (Cl. 73—194)

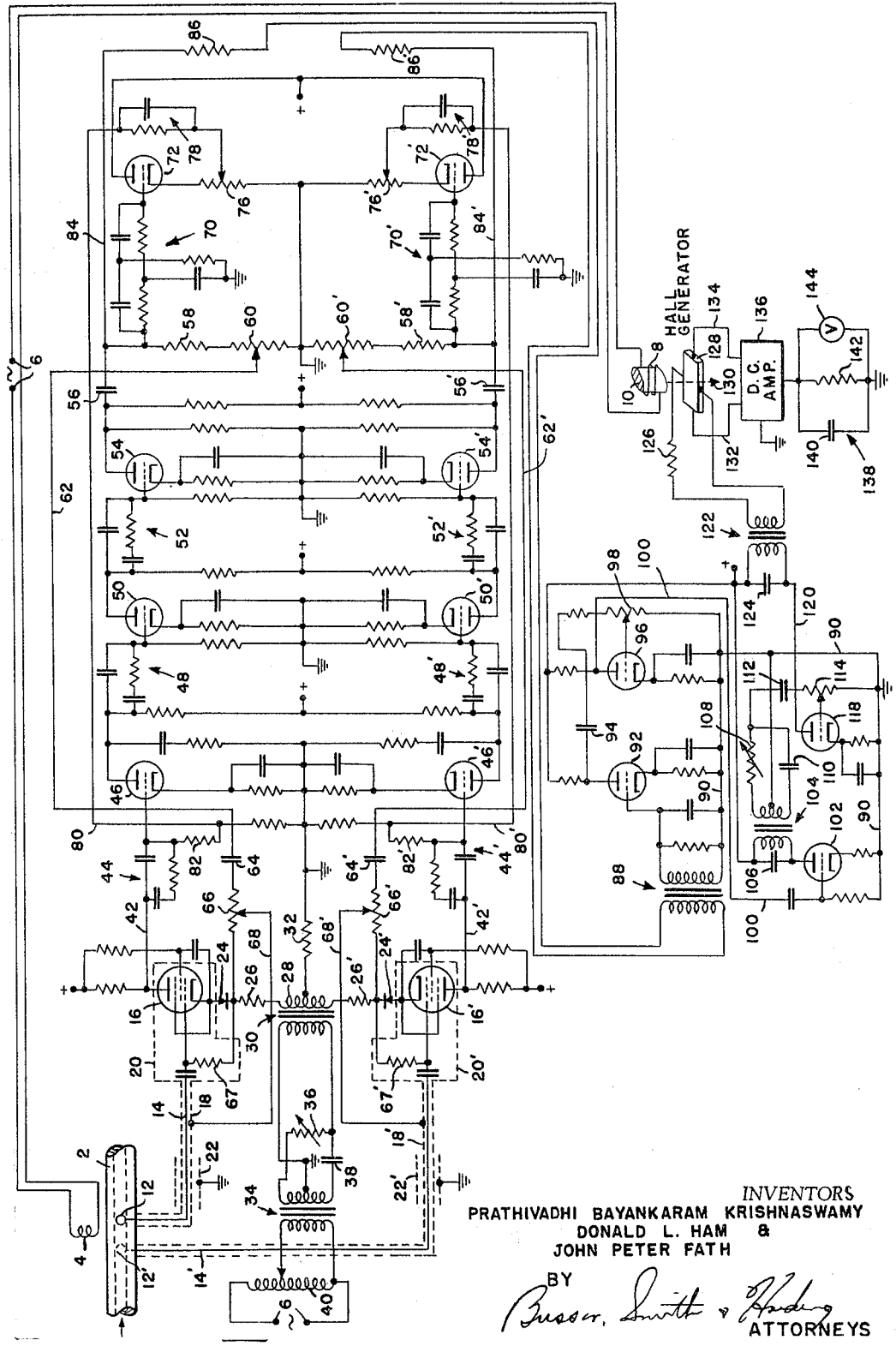

This invention relates to magnetic flowmeters and particularly to flowmeters capable of measuring flow of fluids which would ordinarily be classed as insulators, for example petroleum oils or the like.

As is known, magnetic flowmeters depend on the induction of voltage in a fluid flowing in a magnetic field. Heretofore successful measurements have been made only when the fluids (liquids) have had appreciable conductivity, though with refinements of apparatus flow measurements of liquid having quite low conductivities have been made. In such meters, however, dependence was fundamentally on the conductivity of the liquid.

The general object of the present invention is the provision of a magnetic flowmeter capable of measuring flows of liquids which may be well classed as dielectrics. In accordance with the invention flow measurements may be made of liquids having conductivities of the order of $10^{-6}$ to $10^{-12}$ micromhos per centimeter. Petroleum oils, for example, fall in the class of liquids having such extremely low conductivity. When measurements of this type are made, the electrical system between the pickup electrodes is essentially of an almost pure reactance type. Measurements therefore depend upon the charging current of the effective capacitor provided by the electrode faces exposed to the liquid and the liquid therebetween acting as a dielectric. For purpose of accurate measurement the exposed areas of the electrodes must be relatively small, in order that, for example, the magnetic field in their vicinity may be substantially uniform, and further to prevent pickup of stray signals which would be produced if the exposed areas of the electrodes were extensive. It will be appreciated that under these conditions the useful signals are very small, and the major problem may be said to be the measurement of the useful signal against a very high "noise" background. Besides what may be considered as more conventional sources of noise in magnetic flowmeters measuring the flow of reasonably conductive fluids, other ordinarily negligible noises arise to swamp the minute useful signals. For example, a flowing fluid will give rise to electrostatic noise due to irregularities in its flow existing in the form of eddys or by virtue of friction at the conduit walls. Magnetostrictive effects also arise, occasioning double frequency signals when, as is highly desirable, alternating magnetic field excitation is used. Stray electrical noise in the vicinity of the apparatus also becomes highly significant.

Besides these troubles with noise the mere fact that the electrode-liquid system has an extremely high reactance necessitates feed of the output into a high impedance initial amplifier stage.

Conduit materials are also of great significance, and conduits must be used providing walls having resistivities of the order of one hundred times that of the liquid undergoing measurement to avoid errors of more than 1%. The choice of proper dielectric constant for the wall material is also important, as is the ratio of external to internal diameter of the pipe which should be large to minimize effects of dielectric constant variations. Typically this ratio for acceptable performance should be at least three.

The foregoing and other considerations which will be mentioned hereafter necessitate the use of special measuring apparatus particularly capable of extremely high signal amplification and suppression of noise. In accordance with the invention a correlation technique is used to provide measurable outputs with high discrimination against noise.

The general aspect of attainment of a flowmeter capable of producing results under the above-mentioned conditions is the primary object of the invention, and this as well as subsidiary objects will become apparent from the following description when read in conjunction with the accompanying drawing in which the figure constitutes a schematic diagram of apparatus provided in accordance with the invention and capable of securing the desired results.

There is indicated at 2 a conduit for flowing liquid which will be assumed to have a low conductance of the orders indicated above, i.e., of less than $10^{-6}$ micromhos per centimeter. This conduit in its portion passing through the magnetic field has desirably a ratio of effective external to effective internal diameters of three or more; by "effective" diameters there being meant the diameters of an equivalent correspondingly cylindrical conduit, though the conduit may be other than of circular cylindrical form, for example, of square or rectangular cross-section. Theoretical considerations show that such a thickness of the dielectric wall is effective to keep the operation uniform despite variations of dielectric constant of the flowing fluid undergoing measurement. To secure low dielectric constant of the wall, also of importance, together with high resistivity, the conduit may be typically made of a material such as Synthane C-8 which has a dielectric constant of approximately two and very high resistivity. Various other materials such as Teflon may be used to provide the conduit. A magnetic field is provided to extend transversely of the conduit, and this field in the region of measurement is desirably uniform. Since electromagnet arrangements for producing such a field are well-known (the same type of field being used when flow of liquid of substantial conductivity is being measured) it will be unnecessary to describe the dimensional and physical aspects of the electromagnet. Such electromagnets are commonly supplied in the form of saddle-like windings about ferromagnetic structures as disclosed, for example, in the patent to Head, No. 3,005,342, dated October 24, 1961. For commercial purposes the excitation is desirably alternating at the commercial frequency of sixty cycles, though other frequencies may equally well be used. It will be assumed in what follows that the excitation is at sixty cycles, and is provided to one or more windings such as indicated diagrammatically at 4, supplied from a source indicated at 6. In view of the great significance of any variations from uniformity in the present apparatus it is desirable that the source should be a regulated one to maintain substantially constant amplitude, as well as wave shape. It will be noted from the diagram that the winding arrangement indicated at 4 is provided with current in a series arrangement with a winding 8 of an electromagnet 10. This electromagnet 10, as will appear hereafter, provides the magnetic field for a Hall generator, though as will also be discussed the magnetic field for such a generator may be desirably provided by the electromagnet arrangement which provides excitation at the point of measurement. What is essential is that the magnetic field of the Hall generator should be in phase, or at least in constant phase relationship, with the magnetic field threading the liquid at the point of measurement.

As is usual in magnetic flowmeters, a pair of electrodes are provided along a line transverse to the conduit and mutually perpendicular to the magnetic field and the direction of flow through the conduit. As has already been noted, the aspect of uniformity and avoidance of stray pickups practically limits the usable size of these electrodes, though, in theory, it would be desirable to use electrodes presenting to the liquid as large surface areas as possible. It has been found in practice that as a rule of thumb electrodes desirably provide exposed areas equivalent, essentially, to circular areas which have diameters approximately half the internal diameter of the conduit. For example for a one inch internal diameter conduit there have been successfully used electrodes presenting to the liquid circular faces of one-half inch diameter. The electrodes are desirably of non-magnetic material and may be advantageously made of a metal such as stainless steel having a relatively high resistivity.

Beginning with the electrodes, a major portion of the electrical apparatus is symmetrical with respect to ground, and the symmetrical corresponding elements are designated respectively by unprimed and primed corresponding numerals. To simplify description and to avoid unnecessary repetition, reference will be made primarily to the unprimed numerals, with the understanding that, unless context so indicates, the same descriptive matters apply to the corresponding primed elements. Where non-symmetrical elements are provided that will be readily understood from the context and the schematic diagram.

Considering, therefore, the electrode 12 of the pair 12, 12', its lead is indicated at 14 as running to the control grid of pentode 16. Proper shielding is of the utmost importance in this apparatus, and, as indicated in the diagram, the lead 14 is surrounded by a metallic shield 18, insulated therefrom, which shield is extended as indicated at 20 to surround the pentode 16 and various of its associated elements, particularly its base connections. The shield 18, 20 is driven as described more fully hereafter so that it is at all times substantially at the potential of the lead 14 and grid of pentode 16, with consequent avoidance to a major extent of distributed or stray capacity effects. The shield 18, 20 is surrounded by a second shield which is grounded and which is indicated only fragmentarily at 22. This may take the form of a concentric shield for the lead and a box arrangement elsewhere and desirably encompasses all major parts of the amplification system to provide maximum isolation from external noise sources. Desirably in the vicinity of the leads 14 and 14' and their respective shields separate grounded shields are provided to minimize any interaction between the two sets of leads and driven shields. For simplicity in diagramming, various ground connections are indicated and scattered throughout the figure, but it will be understood that all of these constitute a common ground, and wherever possible the ground connections are brought to a common point. Such grounding arrangements are in accordance with conventional good practice, but are of special significance in the matter of this highly sensitive apparatus.

The cathode of pentode 16 is connected through diode 24, polarized as indicated, to a resistor 26 which runs to one terminal of the secondary 28 of a transformer 30, the other terminal of this secondary being connected to the corresponding resistor 26'. The secondary of a transformer 34 feeds the primary winding of the transformer 30 through a phase-adjusting network involving the series arrangement of the variable resistor 36 and a fixed capacitor 38, one terminal of the primary winding of transformer 30 being connected to the junction between resistor 36 and capacitor 38, while the other terminal is connected to the grounded center tap of the secondary of transformer 34. Adjustment of the value of resistor 36 provides phase adjustment.

The primary of transformer 34 is supplied from a variable auto-transformer 40 which may be of conventional type and is supplied with current from the terminals 6 which are the same as those previously mentioned, though not shown connected to avoid complexity in the diagram. By reason of the assembly just described, there may be provided to the secondary 28 of transformer 30 a signal at the frequency of the sixty cycle supply which is adjustable in both magnitude and phase, the magnitude by adjustment of the auto-transformer, and the phase by adjustment of resistor 36. As will be seen from the diagram, voltages are thus applied in opposite phase to the cathodes of the pentodes 16 and 16' with respect to ground which is connected through resistor 32 to the center tap of the secondary 28. The adjustment here is to provide nulling and, from the overall standpoint, zeroizing of the ultimately measured signal, adjustment being made with the apparatus in operation except for a condition of zero liquid flow rate.

The output from the anode of pentode 16 is fed at 42 through the filter network 44 to the grid of triode 46, from the anode of this triode through filter network 48 to the grid of triode 50, and from the anode of this triode through the filter network 52 to the grid of triode 54. From the anode of this last triode the output is fed through capacitor 56 to the series arrangement of fixed resistor 58 and potentiometer 60 to ground. The arrangement of these amplifier stages is generally conventional, but the filter networks 44, 48 and 52 are so designed as to pass selectively the desired signal frequency with suppression of other frequencies.

A feedback is provided from the adjustable contact of potentiometer 60 through connection 62, capacitor 64, and potentiometer resistance 66 to the junction between diode 24 and resistor 26. This junction is also connected through resistor 67 to the control grid of pentode 16. The adjustable contact of potentiometer 66 is connected at 68 to the driven shield 18.

The feedback just mentioned is of broad band type so that the input impedance of the amplifier remains high at all frequencies. The potentiometer adjustments are so made that the shield 18 is driven substantially to the potential of its enclosed lead 14. Actually some slight overdrive may be desirable to compensate for undriven capacity in the signal circuit; adjustment is made for this by the contact of potentiometer 66. The shield drive controls are set so that the amplifier is just below the point of oscillation.

The output from capacitor 56 is also fed to the twin T filter indicated generally at 70. As is known, such a filter has the characteristic that when properly made it will pass substantially no signal at a given design frequency. In the present instance the filters 70 and 70' are designed for the suppression of the sixty-cycle frequency. The filter 70 provides its output to the grid of triode 72 arranged in a cathode follower circuit with the cathode resistor constituted by the resistance of potentiometer 76. The adjustable contact of potentiometer 76 is connected through the RC network 78 and connection 80 through resistor 82 to the grid of triode 46. The arrangement is such as to provide a high feedback of all frequencies except the sixty cycle frequency, with the net result that the overall amplifier is sharply peaked at sixty cycles. The arrangement described provides a band width of approximately four cycles at the three decibel points.

Capaictors 56 and 56' feed the lines 84 and 84' connected through resistors 86 and 86' to the primary terminals of a transformer 88. This represents the termination of the symmetrical amplification system.

The secondary of transformer 88 provides an input to the amplifier constituted by the triode 92, the input being provided between its grid and the ground line 90. Signals from the anode of triode 92 are fed through capacitor 94 to the potentiometer arrangement 98 having an adjustable contact feeding the grid of another triode 96. The output of this triode is fed through connection 100 to the grid of a further triode 102 having in its anode circuit the primary of a transformer 104 tuned by the capacitor 106. The secondary of transformer 104 has its center tap connected to ground, and its outer terminals are connected to the variable resistor 108 and capacitor 110 arranged in series. The junction between these is connected through capacitor 112 to the potentiometer 114. The adjustment of resistor 108 provides a phase shift adjustment.

The adjustable contact of potentiometer 114 is connected to the grid of the drive triode 118, the anode of which is connected through 120 to the primary of a transformer 122 to the capacitor 124.

The secondary of transformer 122 provides through resistor 126 an output to the semi-conductor plate 128 of the Hall generator indicated at 130. The output of the Hall generator is delivered through connections 132 and 134 to a direct current amplifier 136 which may be of conventional construction. The output from this is delivered to the filter network indicated generally at 138 and comprising the parallel arrangement of capacitor 140 and resistor 142. A voltmeter 144 is connected across the latter to provide the flow reading. This voltmeter may be of any desired type either giving only direct visual readings or, of an automatic type, giving a record on a chart of the variations of flow with time.

The Hall generator is of a type known in the art and available on the market. Such generators are described, for example, in an article entitled "Thin Film Hall Generator" by K. Heid, in "Electronic Equipment Engineering," vol. 9, #11, November 1961, pp. 20–23.

In brief, its operation is essentially that of a synchronous rectifier providing an output which is essentially the product of the mutually in-phase components of the flux of a magnetic field and amplitude of the input signal to the semi-conductor plate 128, the product being of instantaneous values. The actual output is a double frequency series of pulses having a direct component amplified in the amplifier 136 and then measured by the meter 144. It is a signal correlator in the sense that for any components not in phase it provides alternating outputs to the end that these will not affect a direct current meter such as 144.

In the present apparatus, what is desired is the measurement of the signals picked up at the electrode 12 and 12' which are in phase with the flux due to the exciting winding 4. With the proper phase adjustments made throughout the system, the input to the semi-conductor from the transformer 122 is in phase with the desired signals picked up by the electrodes. The flux provided by the electromagnet indicated at 10 is in phase with the flux produced by the electromagnet 4. The signals desired to be correlated, therefore, are in phase. As already noted, while the semi-conductor of the Hall generator is shown as in a separate magnetic field, it may be, and desirably is, located in the field of the electromagnet 4.

As to the matter of noise, however, since this is of a random nature, there may be, over short periods, direct contributions of such noise coming from the amplifier 136. Accordingly it is desirable to provide the network 138 for integration purposes. Desirably, therefore, the time constant of this network is long, and it has been found that a time constant of the order of nineteen seconds is highly satisfactory for suppression of the noise signals.

The overall operation has been essentially described in the description of the circuitry and the functions of its components. Because of the extremely high input impedance of the amplifier due to the feedbacks and filtering arrangements which have been described, the desired signals at the electrodes provided to the input pentodes are very accurately in phase with the flux threading the flowing fluid, the amplifier itself discriminating to a high degree against frequencies other than 60 cycles and against noise. The result is to produce at the input of transformer 88 a useful signal which is of high quality in the sense of low content of undesired components. The final amplification, phase adjustment discriminating action of the Hall generator and the provision of the long time constant smoothing filter network 138 then results in the production of a measured signal which is quite accurately proportional to the flow desired to be measured, excluding the effects of transients due to eddies, frictional effects, or the like. The overall result, therefore, is the possibility of measuring flow of fluids having extremely high resistivities of the orders indicated in the introduction to this specification.

While the Hall generator is especially desirable for securing the desired results, it will be evident that other synchronous means may be used including not only other synchronous rectifiers but, for example, motors having a pair of windings and responsive to the product of inputs to these windings. Such a motor may be used to provide nulling feedback.

It will be clear that various modifications may be made in the circuitry without departing from the invention as defined in the following claims.

What is claimed is:

1. A magnetic flowmeter comprising a conduit for fluid of which the flow is to be measured, means providing an alternating magnetic field transversely threading said conduit, electrodes arranged on a line extending transversely of both said field and the path of fluid flow through said conduit to pick up signals resulting from the fluid flow through said field, an amplifier sharply peaked at the frequency of said field receiving signals from said electrodes, means providing a reference signal synchronized with said field, synchronous product-forming means receiving the output of said amplifier and said reference signal and providing an output in the form of the mathematical product of instantaneous values of the output of said amplifier and of said reference signal, and means measuring the direct component of said product output.

2. A magnetic flowmeter comprising a conduit for fluid of which the flow is to be measured, means providing an alternating magnetic field transversely threading said conduit, electrodes arranged on a line extending transversely of both said field and the path of fluid flow through said conduit to pick up signals resulting from the fluid flow through said field, an amplifier sharply peaked at the frequency of said field receiving signals from said electrodes, means providing a reference signal synchronized with said field, synchronous product-forming rectifier means receiving the output of said amplifier and said reference signal and providing an output in the form of the mathematical product of instantaneous values of the output of said amplifier and of said reference signal, and means measuring the direct component of said product output, the last mentioned means including a smoothing filter of long time constant for the suppression of transient variations of said direct component.

3. A magnetic flowmeter comprising a conduit for fluid of which the flow is to be measured, means providing an alternating magnetic field transversely threading said conduit, electrodes arranged on a line extending transversely of both said field and the path of fluid flow through said conduit to pick up signals resulting from the fluid flow through said field, an amplifier sharply peaked at the frequency of said field receiving signals from said electrodes, means providing a reference signal synchronized with said field, synchronous product-forming rectifier means receiving the output of said amplifier and said reference signal and providing an output in the form of the mathematical product of instantaneous values of the output of said amplifier and of said reference signal, said synchronous rectifier means being in the form of a Hall generator having a magnetic field synchronous with the field threading said conduit and an electrical input provided by the output of the amplifier, and means measuring the direct component of said product output.

4. A magnetic flowmeter comprising a conduit for fluid of which the flow is to be measured, means providing an alternating magnetic field transversely threading said conduit, electrodes arranged on a line extending transversely of both said field and the path of fluid flow through said conduit to pick up signals resulting from the fluid flow through said field, an amplifier sharply peaked at the frequency of said field receiving signals from said electrodes, means providing a reference signal synchronized with said field, synchronous product-forming rectifier means receiving the output of said amplifier and said reference signal and providing an output in the form of the mathematical product of instantaneous values of the output of said amplifier and of said reference signal, said synchronous rectifier means being in the form of a Hall generator having a magnetic field synchronous with the field threading said conduit and an electrical input provided by the output of the amplifier, and means measuring the direct component of said product output, the last mentioned means including a smoothing filter of long time constant for the suppression of transient variations of said direct component.

5. A magnetic flowmeter comprising a conduit for fluid of which the flow is to be measured, means providing an alternating magnetic field transversely threading said conduit, electrodes arranged on a line extending transversely of both said field and the path of fluid flow through said conduit to pick up signals resulting from the fluid flow through said field, an amplifier sharply peaked at the frequency of said field receiving signals from said electrodes, said amplifier including means providing one feedback of broad band type arranged to provide a high input impedance of said amplifier, and said amplifier including means providing a second feedback of substantially all signals except, and with high discrimination against, signals at the frequency of said magnetic field, means providing a reference signal synchronized with said field, synchronous product-forming means receiving the output of said amplifier and said reference signal and providing an output in the form of the mathematical product of instantaneous values of the output of said amplifier and of said reference signal, and means measuring the direct component of said product output.

6. A magnetic flowmeter comprising a conduit for fluid of which the flow is to be measured, means providing an alternating magnetic field transversely threading said conduit, electrodes arranged on a line extending transversely of both said field and the path of fluid flow through said conduit to pick up signals resulting from the fluid flow through said field, an amplifier sharply peaked at the frequency of said field receiving signals from said electrodes, a pair of leads connecting said respective electrodes to said amplifier, individual shields surrounding said leads, means controlled by said amplifier to drive said shields substantially to the potentials of their respective enclosed leads, means providing a reference signal synchronized with said field, synchronous product-forming means receiving the output of said amplifier and said reference signal and providing an output in the form of the mathematical product of instantaneous values of the output of said amplifier and of said reference signal, and means measuring the direct component of said product output.

7. A magnetic flowmeter comprising a conduit for fluid of which the flow is to be measured, means providing an alternating magnetic field transversely threading said conduit, electrodes arranged on a line extending transversely of both said field and the path of fluid flow through said conduit to pick up signals resulting from the fluid flow through said field, an amplifier sharply peaked at the frequency of said field receiving signals from said electrodes, means supplying signals of adjustable phase and synchronous with said magnetic field to the inuput of said amplifier, means providing a reference signal synchronized with said field, synchronous product-forming means receiving the output of said amplifier and said reference signal and providing an output in the form of the mathematical product of instantaneous values of the output of said amplifier and of said reference signal, and means measuring the direct component of said product output.

References Cited by the Examiner

UNITED STATES PATENTS

| | | | |
|---|---|---|---|
| 1,825,855 | 10/1931 | Craig | 329—200 |
| 2,696,737 | 12/1954 | Mittelmann | 73—194 |
| 2,729,103 | 1/1956 | Raynsford et al. | 73—194 |
| 2,733,604 | 2/1956 | Coulter | 73—194 |
| 2,734,380 | 2/1956 | Mittelmann | 73—194 |
| 2,754,464 | 7/1956 | Wizenez et al. | |
| 3,102,429 | 9/1963 | Hardy et al. | 73—466 |
| 3,108,474 | 10/1963 | Sasaki | 73—194 |
| 3,131,560 | 5/1964 | Cushman et al. | 73—194 |

OTHER REFERENCES

"Comparative Pulsatile Blood Flow Contours Demonstrating the Importance of RC Output Circuit Design in Electromagnetic Blood Flowmeters," by Cooper, T. and Richardson, A. W. from "IRE Transactions on Medical Electronics," December 1959, pp. 207–209.

"Measurement of Cardiac Output in Unrestrained Dogs by an Implanted Electromagnetic Meter," by Olmsted, F. from "IRE Transactions on Medical Electronics," December 1959, pp. 210–213.

RICHARD C. QUEISSER, *Primary Examiner.*

HARRY J. ROPER, G. M. GRON, *Assistant Examiners.*